United States Patent
Balestra

(10) Patent No.: US 7,433,789 B1
(45) Date of Patent: Oct. 7, 2008

(54) METHOD, APPARATUS AND COMPUTER PROGRAM PRODUCT FOR DETERMINING A MAINTENANCE VALUE ASSOCIATED WITH A COMPONENT

(75) Inventor: Chester L. Balestra, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/767,792

(22) Filed: Jun. 25, 2007

(51) Int. Cl.
*G06F 19/00* (2006.01)
*G06F 11/30* (2006.01)
*G01L 1/00* (2006.01)

(52) U.S. Cl. ............................ 702/34; 702/42; 702/184
(58) Field of Classification Search .................. 702/33, 702/34, 42, 43, 184
See application file for complete search history.

(56) References Cited

U.S. PATENT DOCUMENTS

| | | | |
|---|---|---|---|
| 4,046,002 A * | 9/1977 | Murphy et al. ................. | 73/116 |
| 4,336,595 A * | 6/1982 | Adams et al. ................. | 702/34 |
| 6,618,654 B1 | 9/2003 | Zaat | |
| 6,968,293 B2 * | 11/2005 | Wiegand ...................... | 702/184 |
| 7,197,430 B2 * | 3/2007 | Jacques et al. .............. | 702/184 |
| 2007/0295098 A1 | 12/2007 | Balestra | |

OTHER PUBLICATIONS

U.S. Appl. No. 11/473,418, filed Jun. 22, 2006, Balestra.
U.S. Appl. No. 11/697,661, filed Apr. 6, 2007, Balestra.
Richard W. Hertzberg, Stress Fluctuation, Cumulative Damage, and Safe-Life Design, *Deformation And Fracture Mechanics Of Engineering Materials*, Fourth Edition, 1996, pp. 532-534, John Wiley & Sons, Inc.
Norman E. Dowling, The Palmgren-Miner Rule, *Mechanical Behavior Of Materials*, Engineering Methods For Deformation, Fracture, And Fatigue, Second Edition, 1999, pp. 401-402, Prentice Hall.
Army Material Maintenance Policy, Army Regulation 750-1, major revision Jul. 15, 2005.
A DOD Initiative, Condition-Based Maintenance Plus, 2005.

* cited by examiner

*Primary Examiner*—Bryan Bui
(74) *Attorney, Agent, or Firm*—Alston & Bird LLP

(57) ABSTRACT

A method, apparatus and computer program product are provided in which information identifying a stress/strain range cycle and the time duration of the stress/strain range cycle associated with the component is received. The maintenance value based upon the actual service life expended during the stress/strain range cycle and the time duration of the stress/strain range cycle is then determined. As such, the component need not be prematurely retired and appropriate compensation or other accounting may be provided for the effective extension in the service life of the component. The determination of the maintenance value may be based on the time duration of the stress/strain range cycle, a residual lifetime and a total number of life cycles for the identified stress/strain range cycle. The retirement of a component may also be recommended in certain instances.

15 Claims, 3 Drawing Sheets

METHOD, APPARATUS AND COMPUTER PROGRAM PRODUCT FOR DETERMINING A MAINTENANCE VALUE ASSOCIATED WITH A COMPONENT

FIELD OF THE INVENTION

Embodiments of the present invention relate generally to a determination of the maintenance value associated with a component, such as the maintenance value associated with an extension of the service life of the component.

BACKGROUND OF THE INVENTION

The remaining service life of mechanical components that undergo repeated stress/strain is generally not readily predictable. Efforts have previously been made to predict the remaining service life of a component based upon the total time that the component has experienced stress/strain cycles. To ensure that a component is not used beyond its predicted lifespan, a component is often retired prematurely, that is, the component may be removed from service, often with significant remaining service life, just to be certain that the component will not fail while in use. As will be apparent, such premature removal of the component from service can be costly since at least a portion of the useful life of the component will be wasted.

By way of further explanation, reference is made to FIG. 1. In this figure, the narrower bell-shaped curve 10 on the right-hand side represents the probability density distribution, i.e., uncertainty, of component strength S, e.g., the distribution of stress/strain range values at a given fatigue life cycle value. The standard deviation, or half-width, of this distribution is determined by the amount of control resident in the component fabrication and constituent material refining processes. The broader curve 12 on the left hand side of FIG. 1 represents the overall spectrum of operational, or usage, stress/strain s that a component is expected to undergo during its operational life. This broader curve is derived from the total number of systems and the total set of conceivable operating conditions. Any single component is contained within a portion of the distribution at the right, and any single operational scenario is contained within a portion of the distribution at the left. Performance versatility dictates that the operational usage distribution 12 be as broad and inclusive as is tolerable. As used herein, "stress/strain" is to be interpreted as stress and/or strain.

In order to ensure that the component does not fail during its service life or at least to reduce the risk of the component failing during its service, the region in which the two distributions overlap, i.e., the region 14 that is shaded in FIG. 1, should be minimized or eliminated, if possible. In instances in which the two distributions overlap, an acceptable common point of operational stress/strain and component strength is employed as the assumed operating condition throughout the life of the component. This common point is at some value of operational stress/strain, $s=\bar{s}+q\sigma_s$, wherein $\bar{s}$ is the mean operational stress/strain value, $\sigma_s$ is the standard deviation and q is a predefined multiplicative factor. This value also has a corresponding value of component strength, $S=\bar{S}-n\sigma_s$ wherein $\bar{S}$ is the mean strength, $\sigma_s$ is the strength distribution standard deviation and n is another predefined multiplicative factor.

This conventional approach suffers from at least two disadvantages. First, in instances of extreme exceedance of operational stress/strain which lie to the right of the strength curve 10, the impact of such extreme exceedance of operational stress/strain is not anticipated and requires human intervention to ensure that the component is appropriately monitored. Additionally, in the more common instance in which the operational stress/strain is lower than that defined by the assumed operating condition, the corresponding extension in the service life that such lower operational stress/strain provides is also not taken into account, thereby resulting in the premature retirement of components with unknown amounts of remaining useful service life.

A service life measurement system has been developed for continuously detecting and tracking operational stress/strain. Examples of a service life measurement system are described by: U.S. Pat. No. 6,618,654 to Stephen V. Zaat; U.S. patent application Ser. No. 11/473,418 filed Jun. 22, 2006 and entitled System and Method for Determining Fatigue Life Expenditure of a Component (hereinafter "the '418 application"); U.S. patent application Ser. No. 11/733,019, filed Apr. 9, 2007 and also entitled System and Method for Determining Fatigue Life Expenditure of a Component (hereinafter "the '019 application"), and U.S. patent application Ser. No. 11/697,661, filed Apr. 6, 2007 entitled Method and Apparatus for Evaluating a Time Varying Signal (hereinafter "the '661 application"), the contents of all of which are incorporated herein by reference. A service life measurement system is generally designed to continuously detect and track operational stress/strain, determine in real time or substantially real time stress/strain ranges that occur in critical areas of components during usage and calculate the duration of each stress/strain range cycle. Each operational stress/strain range that is determined represents a point on the broad operational stress/strain distribution curve 12 of FIG. 1. Of course, any measurement, be it direct or derived, has a mean, or measured, value M and an associated standard deviation, or uncertainty, $\sigma_M$, which is generally considerably less than $\sigma_s$. In order to be conservative, a measurement value of $M+m\sigma_M$ can be assumed for each stress/strain cycle measurement, wherein m is a predefined multiplicative factor.

According to a service life measurement system, the corresponding total number of life cycles $N_f$ that corresponds to the measured operational stress/strain range can be determined with the total number of life cycles $N_f$ being those life cycles that the component could endure if it were to be operated solely at the stress/strain range that was measured. See, for example, the '418 and '019 applications which describe the determination of the total number of life cycles $N_f$ associated with a particular stress/strain range. As further described by the '661 application, the time duration $\Delta t$ associated with each stress/strain range cycle can be determined, such as through the application of rainflow sorting. Accordingly, a service life measurement system provides a technique for determining the stress/strain range cycles occurring at component critical areas along with the corresponding values for the total number of life cycles $N_{fi}$ for each stress range $\Delta\sigma_i$ (or strain range $\Delta\epsilon_i$) in the time duration $\Delta t_i$ of the stress/strain range cycle i.

A service life measurement system therefore provides a technique for more accurately determining the actual stress/strain that a component undergoes during usage and, in turn, the effect of such actual stress/strain upon the expected useful life of a component. Accordingly, owners or lessees of a component, particularly a component that is relatively costly and that has a relatively long lifespan, such as an aircraft, may be interested in the more accurate estimate of the remaining useful lifetime of the component so as to keep the component in service for a longer period of time and to avoid unnecessarily early retirement of the component as has been done in the past. In instances in which the more accurate estimate of the remaining useful lifetime of a component could be provided to the owner or lessee of the component, the owner or lessee of the component would likely be willing to provide compensation for the more accurate estimate, such as in terms of a percentage of the additional lifetime of the component that is provided by reliance upon the more accurate estimate provided by a service life measurement system or the like as opposed to that predicated upon the more conservative traditional approach of early retirement of the component. Accordingly, it would be advantageous to provide a measure of the additional useful life and its relative economic significance so that an appropriate valuation of the extension of the useful lifetime of the component could be determined.

BRIEF SUMMARY OF THE INVENTION

A method, apparatus and computer program product are therefore provided for determining a maintenance value, such as a maintenance credit or the cash value, associated with a component. As such, the maintenance value associated with the additional time during which the component can remain in service can be appropriately determined, thereby avoiding the unnecessary and undesirable effects associated with an early retirement of a component as a result of a failure to appreciate the true remaining lifetime of the component.

In one embodiment, a method is provided in which information identifying a stress/strain range cycle and the time duration of the stress/strain range cycle associated with the component is received. The maintenance value based upon the actual service life expended during the stress/strain range cycle and the time duration of the stress/strain range cycle is then determined. The determination of the maintenance value may be based on the time duration of the stress/strain range cycle, a residual lifetime and a total number of life cycles for the identified stress/strain range cycle. In this regard, the stress/strain range cycle may be evaluated differently depending upon the relative magnitude of $\Delta t_i/T_r$ and $1/N_{fi}$, wherein $\Delta t_i$ is the time duration of the stress/strain range cycle i, T is the residual lifetime and $N_{fi}$ is the total number of life cycles for the identified stress/strain range cycle i. In one embodiment, the determination of the maintenance value may be determined as follows:

$$\text{Maintenance Value} = K_u \sum_i \left( \frac{\Delta t_i}{T_r} - \frac{1}{N_{fi}} \right) + K_o \sum_j \left( \frac{1}{N_{fj}} - \frac{\Delta t_j}{T_r} \right)$$

wherein i and j are indices for the respective stress/strain range cycles in instances i in which $1/N_{fi}$ is less than $\Delta t_i/T_r$ and in instances j in which $1/N_{fj}$ is greater than $\Delta t_j/T_r$, and wherein $K_u$ and $K_o$ are predefined multiplicative factors in instances i in which $1/N_{fi}$ is less than $\Delta t_i/T_r$ and in instances j in which $1/N_{fj}$ is greater than $\Delta t_j/T_r$, respectively.

In one embodiment, the retirement of a component is recommended in instances in which:

$$\left( \sum_i \frac{1}{N_{fi}} + \sum_j \frac{1}{N_{fj}} \right) \geq K_T - \frac{T_o}{T}$$

wherein $K_T$ is a predefined constant, $T_0$ is a prior usage duration and T is a total usage duration such that the residual lifetime $T_r$ is equal to the difference between the total usage duration T and the prior usage duration $T_0$.

By more precisely determining the remaining life of a component based upon the actual stress/strain to which the component is subjected and the time duration of the stress/strain, a maintenance value associated with the extension of the useful life of the component can be reliably determined, thereby permitting proper compensation to be provided to a party that is able to more accurately estimate the remaining useful lifetime of the component and the corresponding retirement date of the component. While a method of determining a maintenance value associated with a component can be provided as described above, other embodiments of the present invention may take the form of an apparatus that includes a processor for performing the respective functions described above as well as a computer program product comprising at least one computer-readable storage medium having computer-readable program code portions stored therein with the computer-readable program code portions including executable portions for performing the respective functions described above upon execution thereof.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

In accordance with one embodiment of the present invention, a method, apparatus and computer program product are provided for determining the maintenance value associated with a component. Although described as a component herein, the component may be a constituent part of a larger assembly or the assembly (including a plurality of constituent parts) itself. In instances in which the component is a constituent part of a larger assembly, similar determinations of the residual lifetime and the corresponding maintenance value associated therewith may be determined for two or more of the constituent parts of the assembly. Alternatively, the determination of the residual lifetime and the corresponding maintenance value may be determined for a single constituent part, such as the most expensive constituent part, the constituent part that is most difficult to repair, replace or otherwise test or the constituent part that may create the most damage and/or down time in the event of an unexpected failure.

Additionally, the method, apparatus and computer program product of the present invention are described in the context of the determination of a maintenance value. This maintenance value may take many forms, such as the cash value associated with the extension of the service life of the component or a maintenance credit to be applied to the charges associated with other maintenance work that is performed upon the component, such as at the time of its eventual repair or replacement. In any event, the determination of a maintenance value is merely intended to be reflective of the determination of the value, in whatever units are relevant, of the worth of the extension of the service life of the component that is permitted as a result of the application of embodiments of the present invention.

Figure 1:
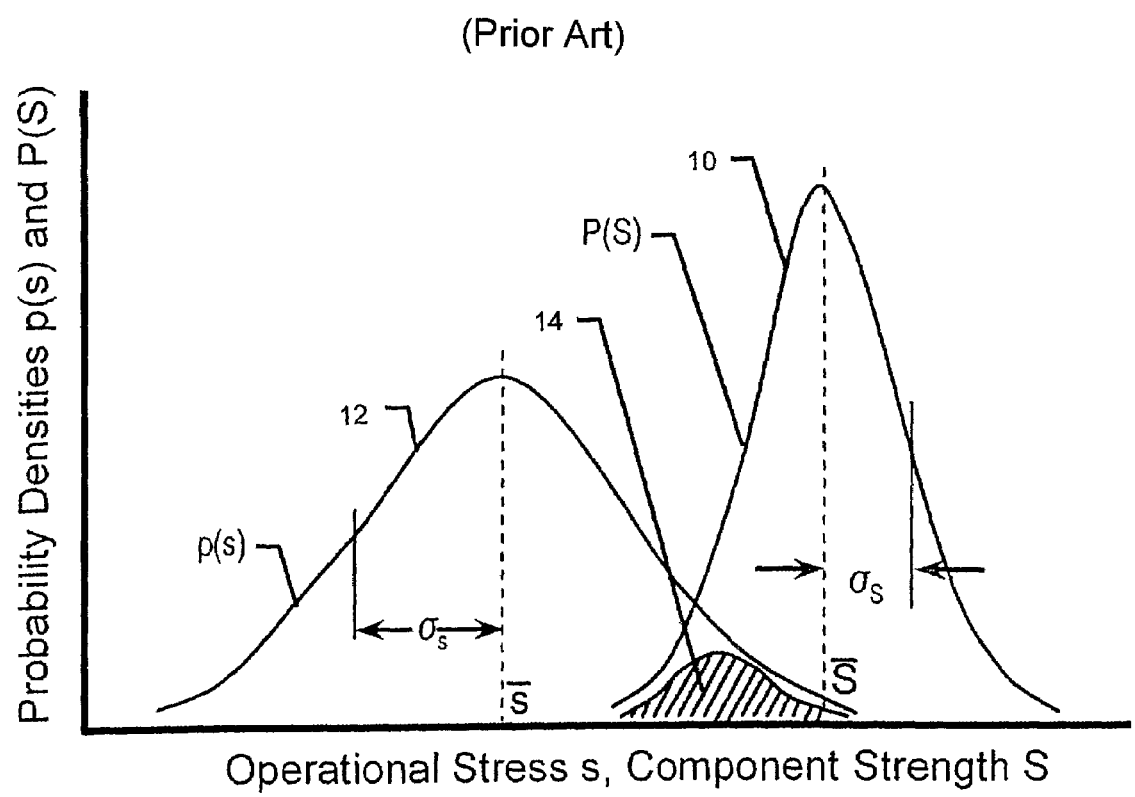
FIG. 1 is a graphical representation of a strength distribution and a stress/strain distribution.
Figure 2:
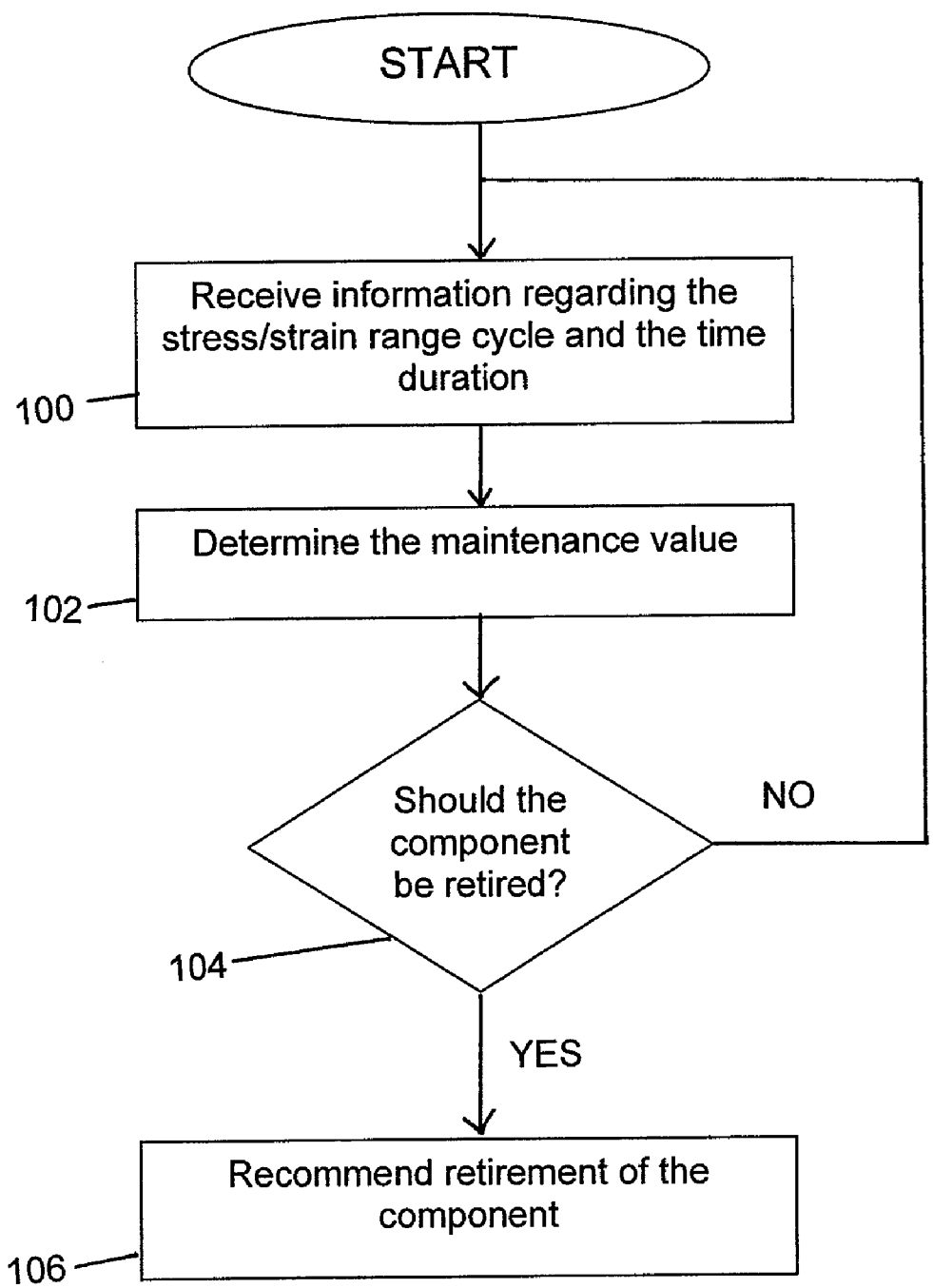
FIG. 2 is a flow chart illustrating operations performed in accordance with a method and computer program product of one embodiment of the present invention.

As shown in block 100 of FIG. 2, information identifying a stress/strain range cycle and a time duration of the stress/strain range cycle associated with the component is received. While this information may be provided in various manners, a service life measurement system and method of the type described by the '418, '019 and '661 applications can provide the stress/strain range cycle and the corresponding time duration as described in more detail therein and as incorporated by reference herein. Based upon the information regarding the stress/strain range cycle and the corresponding time duration, a maintenance value is determined based upon the actual service life expended throughout the time duration of the stress/strain range cycle. See block 102. By determining the actual service life that is expended during the stress/strain range cycle, the actual effect upon the service life of the component can be determined and resort need not be made to a worse case assumption as in conventional approaches.

The maintenance value may be determined based upon the actual stress/strain range cycle and the time duration of the stress/strain range cycle in various manners. In one advantageous embodiment, however, the maintenance value is determined based on the time duration $\Delta t_i$ of the stress/strain range cycle i, a residual lifetime $T_r$ of the component, that is, the lifetime of the component that remains following the stress/strain range cycle, and a total number of life cycles $N_{fi}$ for the identified stress/strain range cycle i. As described, the time duration of the stress/strain range cycle can be provided as described by the '661 application. Similarly, the '418 and '019 applications describe a determination of the total number of life cycles for the identified stress/strain range cycle.

Further, the residual lifetime $T_r$ may be determined as: $T_r = T - T_o$ wherein T is a predefined total usage duration of the component and $T_o$ the actual usage duration, that is, the sum of the usage time to date, i.e., the sum of each $\Delta t$ to date. In one embodiment, the method, apparatus and computer program product determine the maintenance value based upon these factors differently depending upon the relationship of the actual stress/strain range cycle to a predefined worst case usage scenario in which the fraction of the operational life that is lost by a component during a stress/strain range cycle i equals or exceeds the fraction $\Delta t_i / T_r$. In instances in which the actual stress/strain range cycle is less than the predefined worst case scenario, the fraction of the operational life that is lost during a stress/strain range cycle; may be determined as $1/N_{fi}$, while in instances in which the stress/strain range value is greater than the predefined worst case usage scenario, the fraction of the operational life that is lost during the stress/strain cycle i may be determined as $\Delta t_i / T_r$.

In one embodiment, rather than retiring the component when the total usage sum $$\sum_i \Delta t_i / T_r = 1,$$

the component may be retired when $$\sum_i 1/N_{fi}$$

reached some predefined value less than or equal to 1. As such, the difference $(\Delta t_i / T_r - 1/N_{fi})$ establishes a measure of the maintenance credit based on actual service life expended per usage cycle as well as actual usage time. The maintenance value may be determined as follows:

$$\text{Maintenance Value} = K_u \sum_i \left( \frac{\Delta t_i}{T_r} - \frac{1}{N_{fi}} \right) + K_o \sum_j \left( \frac{1}{N_{fj}} - \frac{\Delta t_j}{T_r} \right)$$

wherein i and j are indices for the respective stress/strain range cycles in instances i in which $1/N_{fi}$ is less than $\Delta t_i / T_r$, and in instances j in which $1/N_{fj}$ is greater than $\Delta t_j / T_r$, and wherein $K_u$ and $K_o$ are predefined multiplicative factors in instances i in which $1/N_{fi}$ is less than $\Delta t_i / T_r$ and in instances j in which $1/N_{fj}$ is greater than $\Delta t_j / T_r$, respectively. As illustrated by the foregoing equation, in instances in which the stress/strain range value is less than the predefined worst case usage scenario, the stress/strain range value will be designated by the subscript i and the maintenance value will be determined in accordance with the first term of the equation, that is, $$K_u \sum_i \left( \frac{\Delta t_i}{T_r} - \frac{1}{N_{fi}} \right).$$

In instances in which the stress/strain range value equals or exceeds the predefined worst case usage scenario, however, the corresponding maintenance value will be determined in accordance with the second term of the foregoing equation, that is, $$K_o \sum_j \left( \frac{1}{N_{fj}} - \frac{\Delta t_j}{T_r} \right).$$

As such, the maintenance value may be appropriately determined depending upon the relative magnitude of the stress/strain range value.

Still further, the predefined multiplicative factors $K_u$ and $K_o$ can be determined based upon the commercial value associated with the effective extension of the lifetime of the component. In instances in which the effective extension of the lifetime of the component, that is, the increase in the time for which the component will remain in service prior to being repaired or replaced, is relatively low, such as in instances in which the component is not very costly and/or can be easily repaired or replaced, the predefined multiplicative factors are generally relatively low. Alternatively, in instances in which the component is relatively costly and/or is relatively difficult to repair or replace, the predefined multiplicative constant factors may be greater.

As such, an appropriate economic value associated with the effective extension in the useful lifetime of a component can be determined such that the party that employs a method, apparatus and computer program product of embodiments of the present invention can be appropriately compensated by the party that owns or leases the component for the effective extension in the useful lifetime of the component that is provided in accordance with embodiments of the present invention. Or, in instances in which the same party owns or leases the component and employs a method, apparatus and computer program product of an embodiment of the present invention to determine the effective extension in the useful lifetime of the component, the maintenance value can be determined in order to appropriately account for the value of the extension in the effective useful lifetime of the component, be it for tax, accounting or other purposes.

In addition to determining a maintenance value associated with the effective extension in the useful lifetime of the component, the method, apparatus and computer program product of one embodiment can also provide with a recommendation regarding the eventual retirement of the component. See blocks 104 and 106 of FIG. 2. In this regard, the method, apparatus and computer program product of one embodiment may recommend retirement of the component in instances in which:

$$\left(\sum_i \frac{1}{N_{fi}} + \sum \frac{1}{N_{fj}}\right) \geq K_T - \frac{T_o}{T}$$

wherein $K_T$ is a predefined constant, typically less than or equal to 1.

As such, in instances in which the condition defined by the foregoing equation is met, the method, apparatus and computer program product of one embodiment may recommend retirement of the component, thereby notifying the owner or lessee of the component that the component should be replaced, repaired or otherwise retired. As such, the effective useful lifetime of the component can be extended and an economic value may be associated with the extension in the useful lifetime of the component as described above. However, the method, apparatus and computer program product of embodiments of the present invention also facilitate the eventual retirement of the component in a timely manner so as to avoid undesired failure of the component. In instances in which retirement is not recommended, the process may be repeated upon the receipt of additional information regarding a stress/strain range cycle and the corresponding time duration. This process may be repeated in various manners including following each stress/strain range cycle, at predefined time intervals, following each or a predefined number of missions or the like.

Figure 3:
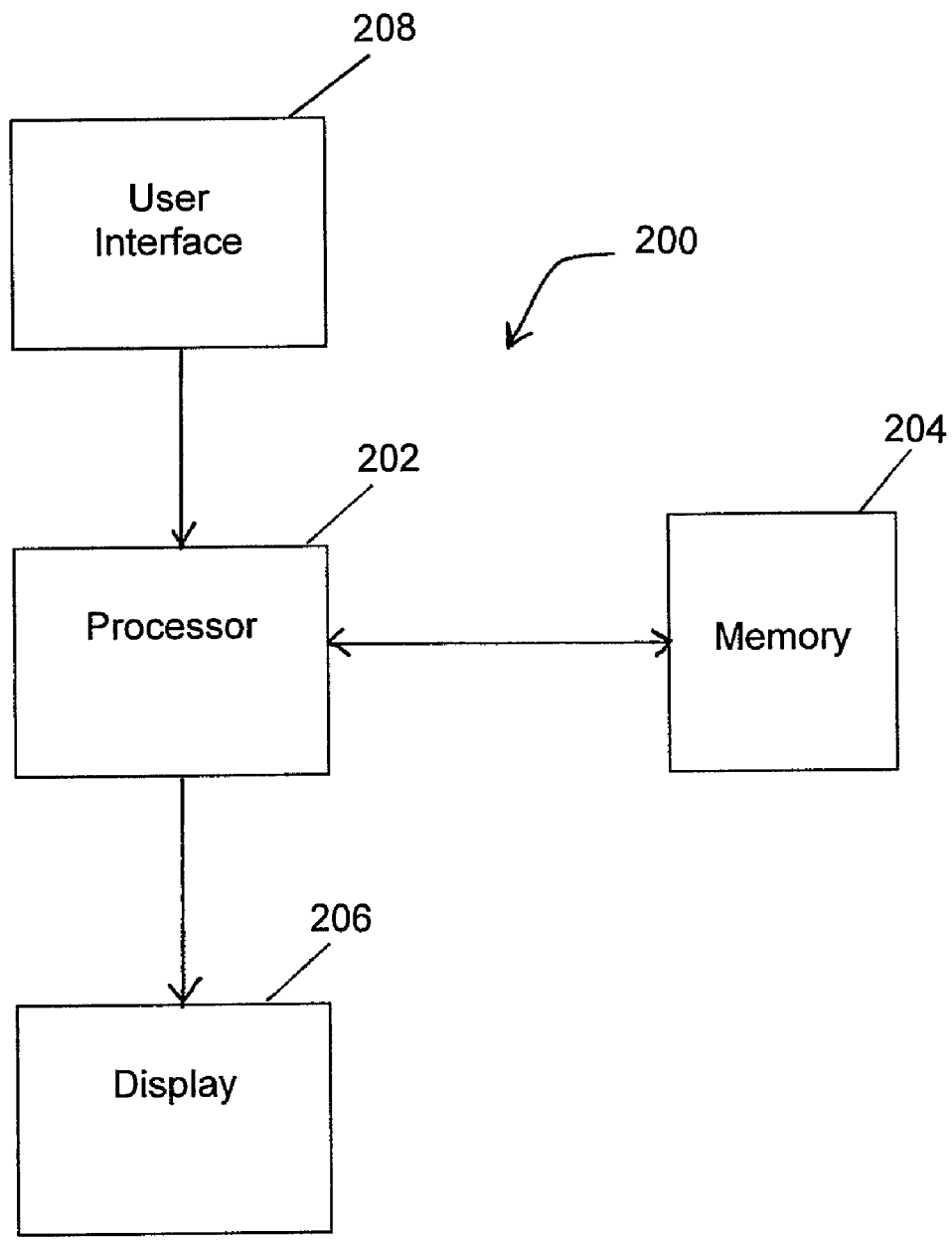
FIG. 3 is a block diagram of an apparatus in accordance with one embodiment of the present invention.

As shown in FIG. 3, the apparatus 200 of embodiments of the present invention is typically embodied by a processing element 202 and an associated memory device 204, both of which are commonly comprised by a computer or the like. In this regard, the method of embodiments of the present invention as set forth generally in FIG. 2 can be performed by the processing element executing computer program instructions stored by the memory device. The memory device may also store the time multiplexed data as well and/or the compressed representation of the time multiplexed data. The computer can include a display 206 for presenting information and/or a user interface 208 for receiving information relative to performing embodiments of the method of the present invention.

According to one aspect of the present invention, the apparatus of embodiments of the present invention generally operates under control of a computer program product according to another aspect of the present invention. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIG. 2 is a flowchart of methods, systems and program products according to exemplary embodiments of the present invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Many modifications and other embodiments of the invention will come to mind to one skilled in the art to which this invention pertains having the benefit of the teachings presented in the foregoing descriptions and the associated drawings. For example, some of the foregoing equations utilized terminology that generally relates to stress, i.e., $\sigma$. However, it should be understood that those equations and the corresponding description apply equally to the effects of strain $\epsilon$. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method of determining a maintenance value associated with a component comprising:
   receiving information identifying a stress/strain range cycle and a time duration of the stress/strain range cycle associated with the component to permit actual service life expended during the stress/strain range cycle to be determined;
   determining the maintenance value based upon the actual service life expended during the stress/strain range cycle and further based upon the time duration of the stress/strain range cycle such that the maintenance value is dependent upon the time duration of the stress/strain range cycle; and
   providing information regarding the maintenance value of the component.

2. A method according to claim 1 wherein determining the maintenance value comprises determining the maintenance value based on the time duration of the stress/strain range cycle, a residual lifetime and a total number of life cycles for the identified stress/strain range cycle.

3. A method according to claim 2 wherein determining the maintenance value further comprises evaluating the stress/strain range cycle differently depending upon a relative magnitude of $\Delta t_i/T_r$ and $1/N_{fi}$ wherein $\Delta t_i$ is the time duration of the stress/strain range cycle i, $T_r$ is the residual lifetime and $N_{fi}$ total number of life cycles for the identified stress/strain range cycle i.

4. A method according to claim 3 wherein determining the maintenance value further comprises determining the maintenance value as follows:

$$\text{Maintenance Value} = K_u \sum_i \left(\frac{\Delta t_i}{T_r} - \frac{1}{N_{fi}}\right) + K_o \sum_j \left(\frac{1}{N_{fj}} - \frac{\Delta t_j}{T_r}\right)$$

wherein i and j are indices for the respective stress/strain range cycles in instances i in which $1/N_{fi}$ is less than $\Delta t_i/T_r$ and in instances j in which $1/N_{fj}$ is greater than $\Delta t_j/T_r$, and wherein $K_u$ and $K_o$ are predefined multiplicative factors in instances i in which $1/N_{fi}$ is less than $\Delta t_i/T_r$ and in instances j in which $1/N_{fj}$ is greater than $\Delta t_j/T_r$, respectively.

5. A method according to claim 4 further comprising recommending retirement of the component in instances in which:

$$\left( \sum_i \frac{1}{N_{fi}} + \sum_j \frac{1}{N_{fj}} \right) \geq K_T - \frac{T_o}{T}$$

wherein $K_T$ is a predefined constant, wherein $T_0$ is a prior usage duration and wherein T is a total usage duration, and wherein $T_r = T - T_0$.

6. An apparatus for determining a maintenance value associated with a component, the apparatus comprising:
a processor configured to receive information identifying a stress/strain range cycle and a time duration of the stress/strain range cycle associated with the component to permit actual service life expended during the stress/strain range cycle to be determined, the processor further configured to determine the maintenance value based upon the actual service life expended during the stress/strain range cycle and further based upon the time duration of the stress/strain range cycle such that the maintenance value is dependent upon the time duration of the stress/strain range cycle, and the processor being further configured to provide information regarding the maintenance value of the component.

7. An apparatus according to claim 6 wherein the processor is configured to determine the maintenance value based on the time duration of the stress/strain range cycle, a residual lifetime and a total number of life cycles for the identified stress/strain range cycle.

8. An apparatus according to claim 7 wherein the processor is configured to determine the maintenance value by evaluating the stress/strain range cycle differently depending upon a relative magnitude of $\Delta t_i/T_r$ and $1/N_{fi}$ wherein $\Delta t_i$ is the time duration of the stress/strain range cycle i, $T_r$ is the residual lifetime and $N_{fi}$ total number of life cycles for the identified stress/strain range cycle i.

9. An apparatus according to claim 8 wherein the processor is configured to determine the maintenance value as follows:

$$\text{Maintenance Value} = K_u \sum_i \left( \frac{\Delta t_i}{T_r} - \frac{1}{N_{fi}} \right) + K_o \sum_j \left( \frac{1}{N_{fj}} - \frac{\Delta t_j}{T_r} \right)$$

wherein i and j are indices for the respective stress/strain range cycles in instances i in which $1/N_{fi}$ is less than $\Delta t_i/T_r$ and in instances j in which $1/N_{fj}$ is greater than $\Delta t_j/T_r$, and wherein $K_u$ and $K_o$ are predefined multiplicative factors in instances i in which $1/N_{fi}$ is less than $\Delta t_i/T_r$ and in instances j in which $1/N_{fj}$ is greater than $\Delta t_j/T_r$, respectively.

10. An apparatus according to claim 9 wherein the processor is further configured to recommend retirement of the component in instances in which:

$$\left( \sum_i \frac{1}{N_{fi}} + \sum_j \frac{1}{N_{fj}} \right) \geq K_T - \frac{T_o}{T}$$

wherein $K_T$ is a predefined constant, wherein $T_0$ is a prior usage duration and wherein T is a total usage duration, and wherein $T_r = T - T_0$.

11. A computer program product for determining a maintenance value associated with a component, the computer program product comprising at least one computer-readable storage medium having computer-readable program code portions stored therein, the computer-readable program code portions comprising:
a first executable portion for receiving information identifying a stress/strain range cycle and a time duration of the stress/strain range cycle associated with the component to permit actual service life expended during the stress/strain range cycle to be determined;
a second executable portion for determining the maintenance value based upon the actual service life expended during the stress/strain range cycle and further based upon the time duration of the stress/strain range cycle such that the maintenance value is dependent upon the time duration of the stress/strain range cycle; and
a third executable portion for providing information regarding the maintenance value of the component.

12. A computer program product according to claim 11 wherein the second executable portion is configured to determine the maintenance value based on the time duration of the stress/strain range cycle, a residual lifetime and a total number of life cycles for the identified stress/strain range cycle.

13. A computer program product according to claim 12 wherein the second executable portion is configured to determine the maintenance value by evaluating the stress/strain range cycle differently depending upon a relative magnitude of $\Delta t_i/T_r$ and $1/N_{fi}$ wherein $\Delta t_i$ is the time duration of the stress/strain range cycle i, $T_r$ is the residual lifetime and $N_{fi}$ total number of life cycles for the identified stress/strain range cycle i.

14. A computer program product according to claim 13 wherein the second executable portion is configured to determine the maintenance value as follows:

$$\text{Maintenance Value} = K_u \sum_i \left( \frac{\Delta t_i}{T_r} - \frac{1}{N_{fi}} \right) + K_o \sum_j \left( \frac{1}{N_{fj}} - \frac{\Delta t_j}{T_r} \right)$$

wherein i and j are indices for the respective stress/strain range cycles in instances i in which $1/N_{fi}$ is less than $\Delta t_i/T_r$ and in instances j in which $1/N_{fj}$ is greater than $\Delta t_j/T_r$, and wherein $K_u$ and $K_o$ are predefined multiplicative factors in instances i in which $1/N_{fi}$ is less than $\Delta t_i/T_r$ and in instances j in which $1/N_{fj}$ is greater than $\Delta t_j/T_r$, respectively.

15. A computer program product according to claim 14 further comprising a fourth executable portion for recommending retirement of the component in instances in which:

$$\left( \sum_i \frac{1}{N_{fi}} + \sum_j \frac{1}{N_{fj}} \right) \geq K_T - \frac{T_o}{T}$$

wherein $K_T$ is a predefined constant, wherein $T_0$ is a prior usage duration and wherein T is a total usage duration, and wherein $T_r = T - T_0$.

* * * * *